UNITED STATES PATENT OFFICE.

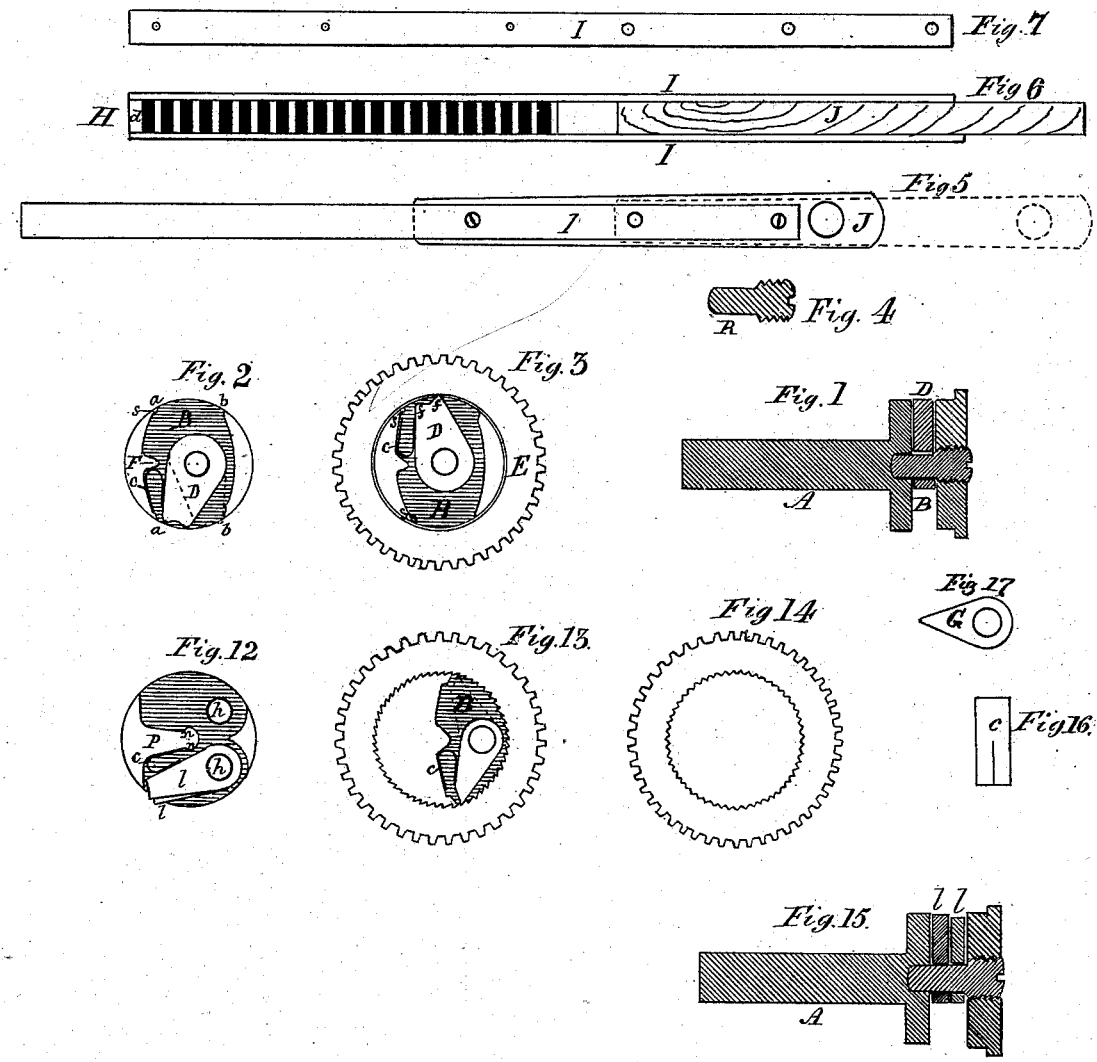

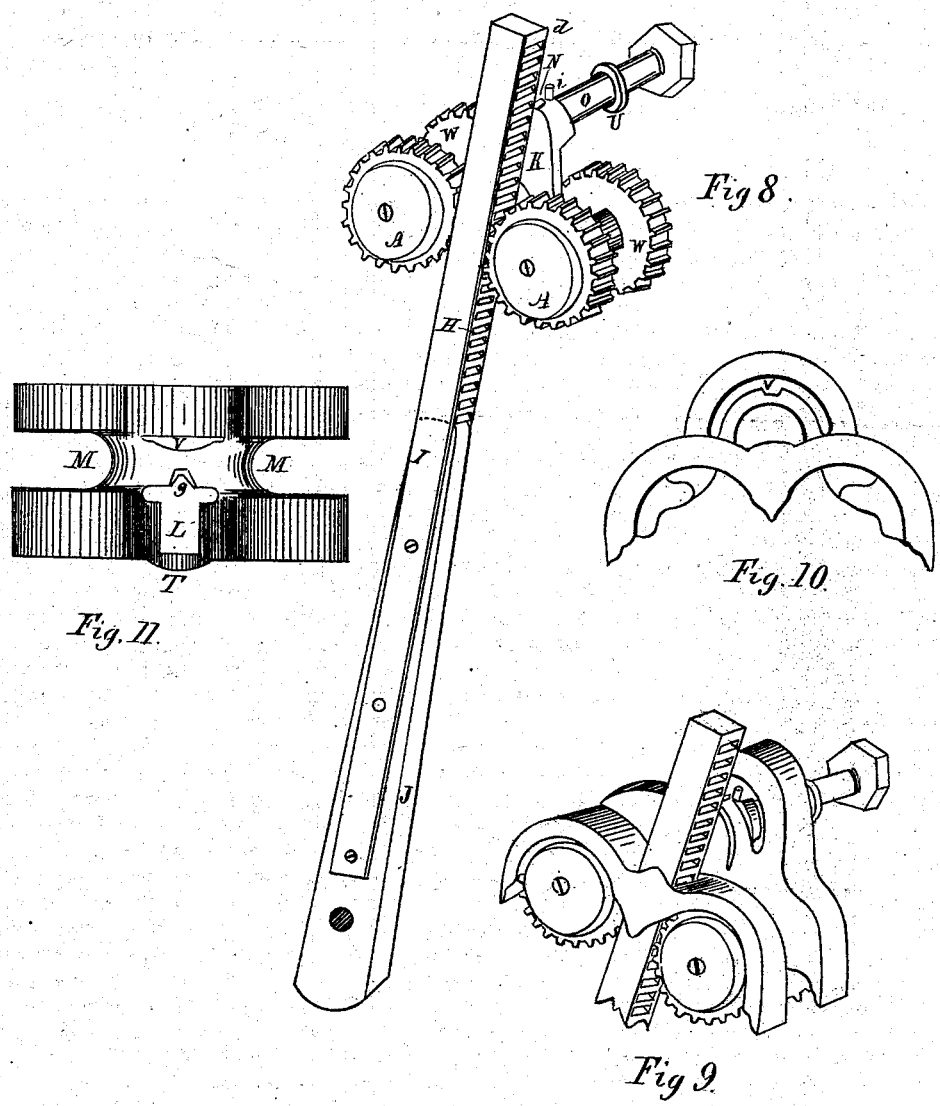

ABSALOM G. SMYTH, OF HAMILTON, ONTARIO, ASSIGNOR OF ONE-HALF TO JOHN SMITH, OF BRANTFORD, CANADA.

DEVICE FOR CONVERTING RECIPROCATING INTO ROTARY MOTION.

SPECIFICATION forming part of Letters Patent No. 252,297, dated January 10, 1882.

Application filed August 11, 1879.

*To all whom it may concern:*

Be it known that I, ABSALOM GRIFFIN SMYTH, of the city of Hamilton, in the county of Wentworth, in the Province of Ontario, Dominion of Canada, have invented certain new and useful Improvements in Devices for Converting Reciprocating Motion into Rotary; and I do hereby declare that the following is a full, clear, and exact description of the construction and operation of the same.

The invention relates to further improvements upon certain devices for which I obtained Letters Patent of the United States dated the 23d day of April, A. D. 1878, and numbered 202,880, for converting reciprocating motion into rotary, and reference may be had to the aforesaid Letters Patent for more full illustrations of my method for converting said motion.

The object of my present improvements is to provide—

First, as regards the lock, a device that is not expensive, and is at the same time effective and durable, and that can be of uniform manufacture, which latter is of very great importance as regards its being reliable for effectiveness and durability; also, the construction is such that it can be applied readily to the various sewing and other machines already manufactured and in use, the drive-wheels of which are run some in one and others in the opposite direction.

Second, the rack-pitman, so constructed that the device for converting motion is rendered interchangeably attachable to the various sewing-machines already manufactured and in use, so that the public can avail themselves of the benefits of said device at a moderate cost.

Third, I construct a guard-frame attachment, made of one entire piece, for covering the several wheels composing the device for converting motion, and provided with an opening, so as not to interfere with the rack, and so constructed that the shafts may be oiled without its removal. The manner of securing it in proper position is also inexpensive. This attachment prevents the operator's clothing from coming in contact with the gear-wheels, and gives a very much better appearance to the device for converting motion when placed upon a sewing-machine or other machines to which it may be applicable.

It will be seen that my present improvements consist chiefly in a locking device, rack-pitman, and guard-frame attachment, reference being had to the accompanying drawings, forming part of this specification, in which—

Figure 1 is a shaft containing a recess or opening, with sectional view of a friction-pawl for locking the device. Fig. 2 is a cross-section of a shaft through recess, showing side view of pawl and edge view of spring in position, the pawl pivoted out of center of shaft. Fig. 3 is a cross-section of shaft through recess, with rack-gear wheel in position, showing that the friction-pawl will engage and clutch said wheel when the top portion is turned toward the right hand. Fig. 4 shows pin with screw formed on the head, for holding the pawls in position. Fig. 5 is a side view of rack-pitman, made in two parts, whereby it may be elongated, as shown by the dotted lines. Fig. 6 is an edge view of rack, showing the metal side pieces extending beyond the cogs, so as to receive a wood piece, making the pitman of suitable length. Fig. 7 is a side view of metal side piece, the large holes being for wood-screws. Fig. 8 is a perspective view of the device. Fig. 9 is a perspective view, showing the guard attachment covering it. Fig. 10 is a front-view elevation of the guard attachment detached. Fig. 11 is a top view of the same. Figs. 12, 13, 14, 15, 16, and 17 show modifications as set forth in the specification.

The shaft A, two of which are used for converting said motion, as will be seen in reference to the above-mentioned patent, contains a recess or opening, B, which extends all the way through the large portion of said shaft, as shown in Fig. 2, to receive the friction-pawl D and spring c, said pawl being pivoted out of center of said shaft and arranged so as to engage the rack-gear wheel E, Fig. 3, (two of which are used, one upon each shaft,) at any point upon the circle of said shaft—say from *a* to *b* (see Fig. 2)—and upon either side of a line drawn through the points where the pawl is pivoted and the center of said shaft, these being the most effective portions of the circle for producing the best results in transmitting the power alternately through the two said shafts when the said wheels are rotated in one direction.

The projection F, formed upon one side of center of said recess, divides the recess into two parts. It also forms a stop or support for the bent end of spring c and prevents it from sliding away from the pawl D. At the points s a slight shoulder is formed in said recess, to confine the said spring c in position and prevent the two ends from coming in contact with the rack-gear wheel E while acting upon the pawl, causing the latter to engage the said wheel, carrying the shaft with it when the top portion is being turned to the right hand, and when the said gear-wheel is turned in the opposite direction the pawl will disengage itself and allow the wheel to turn on the shaft. By placing the said friction-pawl and spring c into the opposite side of said recess B the shaft will revolve in the opposite direction to that before mentioned when the top portion of said wheel is turned toward the left hand, which provides for its ready application to sewing-machines already manufactured and in use, the drive-wheels of which are run some in one and others in the opposite direction. The said friction-pawl D is made of steel, and may be made of the form shown at G, hardened well, and give good satisfaction, provided it is tapered down very narrow at the extreme point— say one thirty-second ($\frac{1}{32}$) of an inch in width or a little more, according to circumstances, such as the amount of power to be transmitted and the length of pawl used, &c.

R is a screw-pin made with a thread on the head portion, which is easily made, and forms a very secure fastening for pivoting the pawl securely in proper position. This construction of pin renders it more practical to make the holes in the shaft to receive the same in cases where the pin is small and the hole too shallow to receive the end of the same.

In the rack-pitman H cogs are cut upon opposite sides of a piece of metal of only sufficient length to receive the required number of said cogs, (see Fig. 6,) two of which at the end of the pitman, (upon either side one,) and shown by d, are left wide, so that they will not pass between the two rack-gear wheels, thereby preventing the rack from passing out of gear.

I is a thin strip of metal, of which two are used, as shown in Fig. 6, being securely fastened upon the sides of the metal cog-piece by rivets or otherwise, and made of sufficient length, extending beyond the cog portion, thereby serving the double purpose of guides to keep the rack in position between the two gear-wheels E and to receive between them a suitable piece of wood or other substance (marked J) to give sufficient length to the pitman to reach the treadle part of the machine.

By using screws to fasten the piece J between the metal strips I the rack-pitman is rendered easily detachable from the gear-wheels when one or more of the cogs at the end d are left wide. When the piece I is made of wood and the side strips, I, have two or more suitable holes in each, wood-screws may be employed, which makes the said pitman both detachable and adjustable, rendering it very practical and convenient for agents to attach the device to sewing and other machines already manufactured or in use.

A guard-frame is made of one piece, (see Figs. 10 and 11,) and is so formed and arranged as to cover the top and sides of the several gear-wheels employed in the device, as shown at Fig. 9, and at the same time allow the rack to pass back and forth between the gear-wheels E, and leaves the holes exposed to oil the two shafts. Upon block K is formed a projection or nib, N, to secure the guard-frame attachment in position.

In Fig. 11, L is the opening in which the rack moves, and said hole could be changed by removing the front swell, T, when it would become a recess.

M M are the two curved sides, extending considerably toward the center, so as to give access to the oil-holes in block K for lubricating the shafts.

g is a recess made in the curved central portion of guard-frame, and shapes that part so that it can pass under the nib N, (see Fig. 8,) formed on the block K.

i is a small pin, which attaches said block to the large pin or stud O, and at the same time is utilized, in connection with the nib N, to retain the guard-frame in position, thereby confining a portion of the frame between the said nib and pin. By taking out the small pin i the guard-frame is rendered easily removable should the gear-wheels or other parts require to be examined.

O is the stud which carries a balance drive-wheel, upon the hub of which is a small gear-wheel, that meshes into the two gear-wheels W W, attached to the shafts A A, whereby power is alternately transmitted from the rack to said balance drive-wheel. Said stud is provided with a collar, U, and may be attached to the frame or any suitable part of the machine.

Slight modifications may be made in the locking device. Very small teeth may be made upon the inside surface of the rack-gear wheels, as shown at Fig. 14, and instead of using a pawl to clutch with friction, the pawl can be so arranged and shaped as to come in contact with the teeth on said wheel, so as to turn the shaft when the wheel is turned in one direction and let go when the wheel is turned in the opposite direction, as shown in Figs. 12 and 13. Also, different-shaped teeth may be used to suit whatever shaped pawl is employed, taking into consideration its length and position in the shaft, as shown in Figs. 13 and 14.

Fig. 12 shows two holes, h h, for pivoting the pawl, so that the said pawl may be placed in either side of the recess, thereby changing the direction that the shaft will be revolved. The projection P is made considerably longer than in Fig. 2, and upon each side, near the end, are shoulders $n$ $n$, formed to retain the spring in position.

Figs. 12 and 15 show two pawls, $l$ $l$, one a little shorter than the other, employed to take up the lost motion between teeth. Said pawls may be pivoted upon the same pin or may be placed in separate positions, in which latter case they can be of the same length. Also, more than two pawls may be employed, so as to take up about all of the lost motion between teeth when reversing the rack, which would produce the same result as the friction-pawl clutching at any point.

These modifications will be beneficial where greater force is to be transmitted than can practically be done with friction-pawls.

Fig. 16 is a side view of a flat spring not bent and split up from one end; or a piece may be cut out about half the length, so that when it is bent and placed into position with the split ends against the two pawls, both pivoted on one screw-pin, (see Fig. 15,) each pawl would act independent of the other, dropping in between the teeth immediately as they respectively pass the points of the teeth. Also, there may be two or more splits made in the spring, according to the number of pawls employed, it being a practical and easy method of arrangement to retain several springs in position, which would otherwise have to be provided for at greater cost.

What I claim as my invention, and desire to secure by Letters Patent, is—

1. An opening or recess, B, placed in a shaft, so constructed and arranged that a pawl may be used upon either side of said shaft and engage the central portion of rack-wheel E, substantially as and for the purposes set forth.

2. A lock or clutching device composed of a recess and pawl, contained in a shaft upon which a loose wheel may be placed, in combination with a rack-pitman, for the purpose of converting reciprocating into rotary motion, as set forth.

3. A rack-pitman having the side pieces, I I, made long, so that a piece, J, may be securely fastened between them, for the purpose set forth.

4. In a rack-pitman, one or more cogs, $d$, left wider than the others, for retaining the rack in gear, as and for the purposes set forth.

5. In combination with a locking device and gear-wheels E E, for converting reciprocating into rotary motion, an adjustable rack-pitman, as and for the purpose set forth.

6. A guard-frame provided with the opening L, or its equivalent, constructed and arranged substantially as and for the purpose set forth.

7. A nib, N, or projection, formed on block K, in combination with pin $i$, or its equivalent, for the purpose of retaining the guard-frame in position, as shown and described.

Dated at Hamilton, Ontario, Canada, this 10th day of July, A. D. 1879.

A. G. SMYTH.

In presence of—
　WM. BRUCE,
　ED. MCINTYRE.